United States Patent Office 3,300,379
Patented Jan. 24, 1967

3,300,379
ANTIBIOTIC THERMORUBIN AND METHODS
OF PREPARING THE SAME
Renato Craveri, Carolina Coronelli, and Piero Sensi, Milan, Italy, assignors to Lepetit S.p.A., Milan, Italy
No Drawing. Filed Jan. 28, 1963, Ser. No. 254,429
Claims priority, application Great Britain, Feb. 6, 1962, 4,557/62
4 Claims. (Cl. 167—65)

This invention provides a new antibiotic substance which is hereinafter referred to as thermorubin and derivatives thereof and also pharmaceutical preparations containing these compounds, and a process for the manufacture thereof.

The new antibiotic has been isolated in crystalline form from a new strain of Actinomyces, which was collected from a soil sample in the neighborhood of Pavia, Italy, and was denominated *Thermoactinomyces antibioticus*. A culture of said microorganism was filed with the American Type Culture Collection under the number 14570.

The isolation of the strain was made by incubating an aqueous suspension of the soil on agar maltose medium at 50° C.

*Thermoactinomyces antibioticus* is a thermophylic Actinomyces which forms colonies with irregular edges, which tend to expand on becoming old; often fairy rings are also formed. It forms an aerial mycelium initially white, but afterwards tending to pale ochre. Its optimum growth is at 50° C. and the microorganism reaches its maximum development after 1–2 days, depending upon the culture medium. The range of pH for the microorganism development is 6.5–10.5, with an optimum at pH 7.5. The morphological characteristics of the strains are the following. The colonies develop by radial elongation of the hyphae actinomyces-like. Vegetative mycelium is formed by ramified flexous hyphae having a 0.4–0.5$\mu$ diameter. Aerial mycelium is formed by shorter hyphae having a 0.6–0.8$\mu$ diameter without spiral formation. Conidial spores, spherical (0.8–1.0$\mu$ diameter) are directly produced on the aerial hyphae or at the very top of very short sporophores; in both cases conidia appear single. Sometimes sporification may occur on hyphae of vegetative mycelium.

For the purpose of identification the growth of *Thermoactinomyces antibioticus* on various nutrient media is described in the following table.

In order to produce thermorubin, *Thermoactinomyces antibioticus* is aerobically cultivated, for example, in an aqueous nutrient solution containing a source of carbon and of nitrogen and inorganic salts, until the solution exhibits a substantial antibiotic action and thermorubin is then isolated.

For example a source of carbon, such as glucose, saccharose, lactose, maltose or starches or glycerine may be used. As nitrogenous nutrients and, if desired, growth promoting substances there may be mentioned amino acids, peptides and proteins, and also their degradation products, such as peptone, tryptone, and also meat extracts, and the water-soluble constituents of cereal grains such as corn steep liquor, of distillation residues in the manufacture of alcohol, of yeast, beans, especially those of soya bean plants, of seeds, for example, of cotton plants and the like, and also ammonium salts and nitrates. Among other inorganic salts the nutrient may contain, for example, chlorides, carbonates or sulphates of alkali metals, alkaline earth metals, magnesium, iron, zinc or manganese.

The strain may be advantageously freeze-dried. From freeze-dried culture (in bovine serum) it is transferred in slants of maltose-agar and after two days of incubation at 50° C., the slants can be stored at room temperature for several months.

Thermorubin is insoluble in water, and easily extracted from the fermentation broths with different solvents, such as butanol, ethyl acetate and chloroform with very high yields. Among these solvents chloroform is preferred due to its greater selectivity with respect to other extractible substances present in the broths, and moreover as it allows a direct precipitation of the antibiotic in crystalline form even during the concentration step.

Thermorubin crystallises easily from chloroform as it forms with it a particularly stable adduct.

The extraction broth is warmed at 30° C., acidified at pH 3.5 and extracted with chloroform (50% of the volume) without separation of the scarce mycelium. Chloroform is separated by centrifugation, anhydrified by paper filtration and concentrated in vacuo until crystallisation takes place. The concentrate is allowed to stand at 0° C. for at least 10–12 hours and filtered; thermorubin in the form of brilliant red-orange crystals is obtained.

The oily mother liquors still contain a considerable amount of thermorubin and are concentrated to complete

| Culture medium | Vegetative mycelium | Aerial mycelium | Soluble | Pigment Biochemical Properties |
| --- | --- | --- | --- | --- |
| Maltose agar | Abundant, hyaline-yellowish. | Abundant, white with ochre nuance. | Absent | |
| Hickey and Tresner's agar | ----do---- | ----do---- | ----do---- | |
| Bennet's agar | ----do---- | Abundant, white with ochre gradations. | ----do---- | |
| Carvajal's agar | Fair growth, hyaline-yellowish. | Fair growth, white with ochre nuance. | ----do---- | |
| Nutrient agar | Fair, hyaline | Fair growth, white | ----do---- | |
| Pepton iron agar | Abundant, hyaline | Abundant, white | ----do---- | It does not produce sulphur hydrogen. |
| Skim-milk agar | Very poor, hyaline | Absent | ----do---- | Strong proteolytic activity. |
| Czapek's glucose agar | No growth | ----do---- | ----do---- | |
| Czapek's maltose agar | Poor, hyaline | Very poor white | ----do---- | |
| Roux potato | No growth | Absent | ----do---- | |
| Carrot Roux | ----do---- | ----do---- | ----do---- | |
| Gelatine | Very poor, surface growth | ----do---- | ----do---- | Fluidification. |
| Synthetic starch agar | Fair growth, hyaline-yellowish. | Fair growth, white | ----do---- | Positive starch hydrolysis. |
| Synthetic tyrosine agar | Moderate growth, hyaline-yellowish. | ----do---- | Light melanine diffusion | Light tyrosine utilisation. |
| Synthetic calcium malate agar. | Fair growth, hyaline-yellowish. | ----do---- | Absent | Not decomposed. |
| Synthetic cellulose | Fair hyaline-yellowish | ----do---- | ----do---- | Cellulose not hydrolysed. |
| Nitrates synthetic broth | Scarce, surface pellicle | Scarce, white | ----do---- | Nitrates not reduced to nitrites (weak reduction in shaked culture). | removal of chloroform. A double oily phase is obtained as a residue: the light colourless one consists mainly of silicone and is discarded, while the heavy brown one is added to fresh chloroform and cooled to 0° C. From this latter phase lighter and less brilliant crystals are generally obtained.

The direct crystallisation of the antibiotic from chloroform is obtained from broths having a title in thermorubin not inferior to 50 $\mu$/ml. Broths of lower titles require that the final brown oil be poured into petroleum ether, to give raw thermorubin. A double crystallisation from methanol and chloroform leads to the recovery of the antibiotic in crystalline form.

Thermorubin is insoluble in water, sulphur ether, petroleum ether, very poorly soluble in methanol and other alcohols having low molecular weight, ethyl acetate and higher esters, benzene, chloroform, acetone; very soluble in dioxane, tetrahydrofuran, dimethylformamide, pyridine; it is soluble in concentrated alkalies with loss of microbiological activity in, concentrated sulphuric acid with yellow-green fluorescence and in glacial acetic acid.

Thermorubin darkens at 190° C. and does not melt below 300° C. Specific rotatory power: $[\alpha]_D^{25} = 14°$ (c. 0.4 dioxane). The absorption spectrum in dioxane: cyclohexane shows characteristic maxima at 300 m$\mu$ $E_{1cm.}^{1\%} = 1041.9$; 328 m$\mu$ $E_{1cm.}^{1\%} = 1066.3$; 414 m$\mu$ $E_{1cm.}^{1\%} = 313.7$; 430 m$\mu$ $E_{1cm.}^{1\%} = 332.6$.

Samples of antibiotic crystallised from different solvents show I.R. spectra in Nujol with very different patterns, due to the fact that thermorubin easily forms solvates with various solvents and crystallises in different forms. The I.R. spectrum of thermorubin crystallised from chloroform shows the following bands 3010, 2925 (Nujol), 2850 (Nujol), 1720, 1698, 1673, 1607, 1582, 1552, 1505, 1487, 1457 broad (Nujol), 1417, 1380 (Nujol), 1343, 1295, 1249, 1235, 1223, 1177, 1170, 1157, 1120, 1099, 1084, 1065, 1042, 1035, 1002, 978, 958, 942, 927, 910, 893, 881, 860, 824, 815, 801, 782, 762, 745, 727, 694, 662, 654. The I.R. spectrum of thermorubin crystallised from ethyl acetate shows the following bands: 2925 (Nujol), 2850 (Nujol), 1705, 1665, 1608, 1575, 1543, 1505, 1487, 1456 broad (Nujol), 1435, 1378 (Nujol), 1347, 1327, 1295, 1256, 1245, 1223, 1196, 1163, 1118, 1108, 1085, 1032, 998, 977, 964, 890, 856, 830, 822, 775, 765, 750, 725, 691.

Thermorubin is stable in solutions with acid pH; at pH 8 and at temperatures above 37° C. its activity decreases very rapidly. The inactivation at alkaline pH is accompanied by a decrease of the absorption maxima; solutions in N/10 NaOH after 48 hours show no characteristic maxima.

Thermorubin does not contain nitrogen, sulphur or other elements than carbon, hydrogen and oxygen; the elemental analysis gives: C 64.15%, H 4.24%, O 31.50%; the molecular weight cryoscopically determined in dioxane (c. 4%) is 432. From these data the formula $C_{22}H_{18}O_8$ has been deduced; molecular weight 410.36, calculated percentages: C 64.3, H 4.41, O 31.2, is fairly in agreement with those experimentally found.

Thermorubin has a weak acidic character; as it cannot be titrated in aqueous solution this acidity is probably due to a carboxyl group. By titrating in dimethylformamide (c. 0.2%) two potentiometric stages are observed, which can be attributed to two weak acidic functions.

Thermorubin contains two methoxyl groups and no acetyl groups; by acylation with acetic anhydride in pyridine a diacetyl derivative is obtained. The characteristics of the diacetyl derivative crystallised from ethyl acetate are the following: C 62.46%, H 4.26%, O 33.28% (theoretical values for thermorubin diacetylate: C 62.5%, H 4.20%, O 33.30%), acetyl groups 28.5%–28.7% (theoretical value for two acetyl groups present 29%).

A solution of this diacetyl derivative in dioxane:cyclohexane 1:1 shows the following maxima in the U.V. and visible spectrum:

337 m$\mu$ $E_{1cm.}^{1\%} = 157.4$; 434 m$\mu$ $E_{1cm.}^{1\%} = 85.1$; 460 m$\mu$ $E_{1cm.}^{1\%} = 128.6$; 551 m$\mu$ $E_{1cm.}^{1\%} = 63.4$

Thermorubin rapidly decolourises permanganate in both acid and neutral solutions, reduces Tollens and Fehling reagents and gives a brown colouration with $FeCl_3$.

Thermorubin has a high activity against various microorganisms. In vitro, by using the serial dilutions method the following concentrations of thermorubin sodium salt are inhibitory of the growth of various test microorganisms.

| Strains: | Minimal inhibitory concentrations, $\gamma$/ml. |
|---|---|
| M. aureus 2099 | 0.001 |
| S. faecalis | 0.5 |
| S. haemolyticus | 0.05 |
| Diplococcus pn. | 0.5 |
| Sarcina lutea | 0.05 |
| B. subtilis | 0.1 |
| Proteus vulgaris X 19 | 10 |
| Escherichia coli | 2 |
| Salmonella typhi—Roma | 10 |
| Salmonella paratyphi—A | 20 |
| Salmonella schottmuelleri—B | 10 |
| Shigella sonnei | 20 |
| Shigella flexneri xer 3 | 1 |
| Klebsiella pn. | 10 |
| Pseudomonas aer. | 100 |
| Pasteurella multocida | 0.5 |
| H 37 Rv | 100 |

Thermorubin is also active in vivo. When mice infected with S. aureus Gray were treated i.p. for 3 days with 3 mg. of antibiotic per kilogram of body weight, 100% of survivals were observed. These doses were tolerated without any harm by non-infected mice; $LD_{50}$ is 300 mg./kg.

EXAMPLE 1

A maltose agar medium having the following composition:

| | | |
|---|---|---|
| Soja infusion | g | 5 |
| Raw maltose | g | 20 |
| Yeast extract | g | 2 |
| Agar | g | 20 |
| Tap water | ml | 1000 | is inoculated with a suspension of spores obtained from a slant and incubated (in a thermostat) at 50° C. for 24 hours. On washing the Fernbach bottle with glass beads a spore suspension is obtained and 5 fermentors (20 l.) containing 10 l. of liquid medium having the following composition are inoculated:

| | | |
|---|---|---|
| Soja | g | 5 |
| Raw maltose | g | 20 |
| Yeast extract (Difco) | g | 2 |
| Peptone | g | 5 |
| Glucose | g | 5 |
| Tap water | ml | 1000 |

The production conditions are the following: Shaking; 500 r.p.m.; aeration 0.75 v./v./m.; temperature 50° C.; antifoam: silicone (antifoam "A" St. Gobain). After 20–24 hours the highest antibiotic concentration is reached. 150–200 $\gamma$/ml. and fermentation is stopped. The fermentation course of thermorubin in a 20 l. fermentor is given by the following table.

| Time (h) | pH | Percent Mycelial volume [1] | Antibiotic activity/ml.[2] |
|---|---|---|---|
| 0 | 6.8 | | |
| 6 | 6.5 | 0.5 | |
| 12 | 7.0 | 2.5 | 5 |
| 18 | 7.2 | 4.0 | 30 |
| 24 | 7.7 | 2.0 | 160 |
| 36 | 8.3 | 1.0 | 40 |
| 48 | 8.5 | 1.0 | 20 |

[1] Determined by centrifugation of the culture broth for 10 minutes at 3000 runs.
[2] Test: *Sarcina lutea* ATCC 9341.

The antibiotic content of the culture filtrate after 20–24 hours of fermentation on various microorganisms is given in the following table.

| Microorganism test: | Antibiotic activity in dilution unities |
|---|---|
| *Sarcina lutea* ATCC 9341 | 1/20,000 |
| *Staphylococcus aureus* ATCC 6538 | 1/20,000 |
| *Bacillus subtilis* ATCC 6633 | 1/16,000 |
| *Bacillus cereus* var. *mycoides* ATCC 9634 | 1/2,000 |
| *Corynebacterium simplex* Le B 5 * | 1/2,000 |
| *Mycobacterium phlei* Le B 20 * | 1/1,000 |

*Lepetit culture collection.

EXAMPLE 2

From a slant obtained as described in Example 1, a spore suspension is prepared and a 500 ml. flask is inoculated containing 100 ml. of liquid medium having the composition given in Example 1. After 18 hours' shaking at 50° C. the flask is inoculated in a 10 l. fermentor containing 4 l. of the above liquid medium. The growth conditions of the strain are the same as described in Example 1. After 20–24 hours the culture broth reaches a percentage mycelial volume of 2–3 and a pH of 7.5–8.0. With the above culture broth a 10% inoculum in a 20 litre fermentor containing 10 litres of the above medium is performed. The fermentation conditions are the same as in Example 1, but in this second case the results are less reproducible.

EXAMPLE 3

Fifty litres of culture broth having a thermorubin activity of 160 γ/ml. are cooled with shaking to about 30° C., adjusted at pH 4.5 and extracted with 25 l. of chloroform. The exhausted broth is centrifugated and its microbiological activity in thermorubin is of 4–5 γ/ml. The dried chloroform solution is concentrated in vacuo in an evaporator at a temperature below 35° C. Yield: 6.9 g. of thermorubin having an activity of 74.5%. After further concentration 2.3 g. of antibiotic (51% activity) are recovered. Total extraction yield 78%.

EXAMPLE 4

Fifty litres of culture broth with thermorubin activity of 20 γ/ml. are treated as described in Example 3. The final red-brown oily mass is poured into 10 times at least of its volume of petroleum ether. By filtration 3.3 g. of raw product are recovered. The raw thermorubin is dissolved in one litre of warm methanol and the obtained solution is concentrated to about 100 ml. After cooling at 0° C. 1.350 g. of crystalline product having an activity of 50% are recovered. This latter is dissolved with warming in 1350 ml. of chlorofrom and by concentration 700 mg. of crystalline thermorubin having an activity of 85% are obtained. Total extraction yield 59.5%.

EXAMPLE 5

*Monosodium salt of thermorubin*

Thermorubin is dissolved in a minimum amount of dioxane at room temperature, the solution is filtered from occasional impurities and diluted with water (1:10). On diluting thermorubin precipitates and 0.1 N NaOH in stoichiometric amount is added to this suspension to form the monosodium salt. This addition is carried out on cooling with ice and under strong stirring to avoid inactivation due to the rising pH. The clear final solution having pH 7–8 is freeze-dried.

The sodium salt thus obtained has a 10,000 γ/ml. solubility in water. The aqueous solutions are stable at 22° C. for at least 10 hours; after about 24 hours 30% is inactivated.

We claim:
1. An antibiotic substance named thermorubin, of weak acidic character, insoluble in water, ethyl ether, petroleum ether, very poorly soluble in methanol and alcohols of low molecular weight, ethyl acetate and higher esters, benzene, chloroform, acetone; very soluble in dioxane, tetrahydrofuran, dimethylformamide, pyridine; having a decomposition point at 190° C. (darkening) and a melting point not lower than 300° C., its elemental analysis being: C, 64.15%, H, 4.74%, O, 31.50%, thus an approximate crude formula of $C_{22}H_{18}O_8$ being deduced; having a specific rotatory power of: $[\alpha]_D^{25} = +14°$ (c.=0.4 in dioxane) and an absorption spectrum in dioxane-cyclohexane with characteristic maxima at

300 mμ $E_{1\,cm.}^{1\%} = 1041.9$; 328 mμ $E_{1\,cm.}^{1\%} = 1066.3$; 414 mμ $E_{1\,cm.}^{1\%} = 313.7$; 430 mμ $E_{1\,cm.}^{1\%} = 332.6$;

showing in the infrared region of the spectrum, when crystallised from chloroform, the following bands: 3010, 2925 (Nujol), 2850 (Nujol), 1720, 1698, 1673, 1607, 1582, 1552, 1505, 1487, 1457 broad (Nujol), 1417, 1380 (Nujol), 1343, 1295, 1249, 1235, 1223, 1177, 1170, 1157, 1120, 1099, 1084, 1065, 1042, 1035, 1002, 978, 958, 942, 927, 910, 893, 881, 860, 824, 815, 801, 782, 762, 745, 727, 694, 662, 654; and, when crystallised from ethyl acetate: 2925 (Nujol), 2850 (Nujol), 1705, 1665, 1608, 1575, 1543, 1505, 1487, 1456 broad (Nujol), 1435, 1378 (Nujol), 1347, 1327, 1295, 1256, 1245, 1223, 1196, 1163, 1118, 1108, 1085, 1032, 998, 977, 964, 890, 856, 830, 822, 775, 765, 750, 725, 691.

2. The monosodium salt of thermorubin.
3. A process which comprises cultivating under aerobic conditions a thermorubin producing strain of *Thermoactinomyces antibioticus* in aqueous medium containing a source of carbon, nitrogen and essential inorganic salts, under such conditions of temperature for such a period of time that substantial production of antibiotic is reached, and recovering said antibiotic from the medium.
4. A process which comprises cultivating under aerobic conditions a strain of *Thermoactinomyces antibioticus* ATCC 14570 in aqueous medium containing a source of carbon, nitrogen and essential inorganic salts, for 12 to 48 hours at a temperature of around 50° C. in a range of pH from 6.5–10.5.

No references cited.

JULIAN S. LEVITT, *Primary Examiner.*

SAM ROSEN, *Assistant Examiner.*